Patented Apr. 6, 1943

2,316,128

UNITED STATES PATENT OFFICE 2,316,128

WATER-SOLUBLE CARBOXYETHYL STARCH ETHERS

Louis H. Bock, Huntingdon Valley, and Alva L. Houk, Philadelphia, Pa., assignors to Röhm & Haas Company, Philadelphia, Pa., a corporation of Delaware No Drawing. Application February 21, 1942, Serial No. 431,840

4 Claims. (Cl. 260—209)

This invention relates to β-carboxyethyl ethers of starch which are soluble in water and which result by the reaction of alkali, starch, and acrylonitrile.

The soluble carboxyethyl ethers of starch are prepared by suspending starch in a dilute solution of a strongly alkaline hydroxide and reacting the starch with acrylonitrile. The starch may be of root origin, such as tapioca, or from a grain, such as wheat or corn, and may be in a raw state or in a gelatinized or solubilized state which has been reached without appreciable degradation.

As the hydroxide there may be used an alkali metal hydroxide, such as lithium, sodium, or potassium hydroxide, or a strongly basic quaternary ammonium hydroxide, such as tetramethyl ammonium hydroxide, trimethyl benzyl ammonium hydroxide, dimethyl dibenzyl ammonium hydroxide, etc., or mixtures of strongly basic hydroxides. The concentration of the alkali may be varied from about 1% to about 10% and the proportion of alkali may be conveniently varied from 0.025 to about 2 mols per glucose unit of the starch.

The proportions of acrylonitrile used in preparing the water-soluble carboxyethyl ethers of starch may be varied from about 0.1 to about 1.5 mols per glucose unit. The upper limit is not sharp, since starch itself can be rendered soluble by other means, but, as the proportion is increased above one mol of acrylonitrile per glucose unit, it becomes increasingly necessary to promote the reactions involved by altering time and temperature.

The temperatures at which the reaction may be performed are not critical except that it is not desirable to maintain the starch reaction mixture at such high temperatures as to cause degradation. For practical purposes, the temperature of the mixture of starch, alkali, and acrylonitrile should be maintained between 0° C. and about 60° C. At the higher temperatures, shorter times are generally required to render the product water-soluble. Shorter times are likewise favored by lower proportions of acrylonitrile. With 0.1 to 0.5 mol of acrylonitrile, for example, the reaction requires only five or six hours for conversion to a water-soluble form. As more acrylonitrile is used, in general more time must be allowed for rendering the products water-soluble.

Further details of the preparation of water-soluble carboxyethyl ethers of starch are given in the following examples:

Example 1

To a suspension of 33 parts of tapioca starch in 300 parts of water were added 20 parts of a 20% sodium hydroxide and 2.6 parts of acrylonitrile. The resulting viscous solution was mixed for six hours at room temperature and neutralized to pH 7.2 with hydrochloric acid. The resulting solution was very clear, colorless, and of medium viscosity.

Example 2

To 33 parts of potato starch in 300 parts of water were added 20 parts of 20% sodium hydroxide and 10.6 parts of acrylonitrile. After the mixture was stirred for six hours at 50° C., it was allowed to stand overnight before being neutralized with hydrochloric acid. A thin solution of very slight turbidity was formed.

Example 3

To 330 parts of wheat starch were added 100 parts of 10% sodium hydroxide and then, in small portions, 106 parts of acrylonitrile. Mixing was continued for five hours at room temperature, after which 1,000 parts of water was added. The reaction mixture was left standing for three days and then was neutralized with acetic acid to form a slightly turbid solution of low viscosity.

The water-soluble products of this invention are useful as sizing agents for yarns, fabrics, paper, and the like. They are also useful as protective colloids, which stabilize dispersions or emulsions, and which are useful as spreading and depositing agents in insecticidal and fungicidal sprays.

We claim:

1. The process of preparing a water-soluble carboxyethyl ether of starch which comprises reacting by mixing within the temperature range of 0° and about 60° C. starch, a 1% to 10% solution of a strongly basic, water-soluble hydroxide, and acrylonitrile, the proportion of hydroxide being 0.025 to about 2 mols and of acrylonitrile being about 0.1 to about 1.5 mols per glucose unit of the starch.

2. The process of preparing a water-soluble carboxyethyl ether of starch which comprises reacting by mixing between 0° and 60° C. starch, a 1% to 10% solution of sodium hydroxide, and acrylonitrile, the proportion of hydroxide being 0.025 to 2 mols and of acrylonitrile being about 0.1 to about 1.5 mols per glucose unit of the starch.

3. The process of claim 2 in which the starch is tapioca starch.

4. A water-soluble β-carboxyethyl ether of starch.

LOUIS H. BOCK.
ALVA L. HOUK.